United States Patent [19]

Stencel et al.

[11] Patent Number: 5,634,751

[45] Date of Patent: *Jun. 3, 1997

[54] BLIND FASTENER WITH DEFORMABLE SLEEVE

[75] Inventors: Edgar L. Stencel, Alta Loma; Paul P. Krawiec, Hacienda Heights, both of Calif.

[73] Assignee: Monogram Aerospace Fasteners, Los Angeles, Calif.

[*] Notice: The term of this patent shall not extend beyond the expiration date of Pat. No. 5,498,110.

[21] Appl. No.: 584,188

[22] Filed: Jan. 11, 1996

Related U.S. Application Data

[63] Continuation of Ser. No. 201,759, Feb. 25, 1994, Pat. No. 5,498,110.

[51] Int. Cl.$^6$ ............................................. F16B 13/04
[52] U.S. Cl. ....................................... 411/43; 411/37
[58] Field of Search ................................. 411/34, 36, 37, 411/38, 43, 55

[56] References Cited

U.S. PATENT DOCUMENTS

| | | | |
|---|---|---|---|
| 2,679,879 | 6/1954 | Engstrom . | |
| 2,760,399 | 8/1956 | Rea . | |
| 2,914,106 | 11/1959 | Boyd | 411/38 |
| 2,971,425 | 2/1961 | Blakeley | 411/38 |
| 3,063,329 | 11/1962 | Vaughn | 411/37 |
| 3,107,572 | 10/1963 | Orloff | 411/37 |
| 3,267,793 | 8/1966 | Devine et al. | 411/37 |
| 3,292,482 | 12/1966 | Fry et al. . | |
| 3,345,900 | 10/1967 | Villo | 411/34 |
| 4,089,247 | 5/1978 | Dahl et al. | 411/36 |
| 4,237,768 | 12/1980 | Volkman | 411/38 |
| 4,376,604 | 3/1983 | Pratt et al. | 411/34 |
| 4,457,652 | 7/1984 | Pratt | 411/38 |
| 4,579,491 | 4/1986 | Kull | 411/55 |
| 4,595,324 | 6/1986 | Sadri | 411/38 |
| 4,850,771 | 7/1989 | Hurd | 411/43 |
| 4,968,198 | 11/1990 | Binns . | |
| 5,018,920 | 5/1991 | Speakman | 411/43 |
| 5,066,179 | 11/1991 | Pratt | 411/34 |
| 5,123,792 | 6/1992 | Strobel . | |
| 5,135,340 | 8/1992 | Stinson | 411/34 |
| 5,238,342 | 8/1993 | Stencel . | |
| 5,256,017 | 10/1993 | Smirnov et al. . | |
| 5,350,264 | 9/1994 | Stencel . | |
| 5,498,110 | 3/1996 | Stencel et al. | 411/34 X |

FOREIGN PATENT DOCUMENTS

| | | |
|---|---|---|
| 510011 | 7/1955 | Canada . |
| 170769 | 7/1986 | European Pat. Off. . |
| 2515283 | 4/1983 | France . |

OTHER PUBLICATIONS

Copy of portion of Monogram Aerospace Fasteners Brochure for Visu–Lok II Bind Bold (undated).
Drawing of Monogram Aerospace Fasteners Composi–Lok Blind Bold prepared by Edgar L. Stencel (undated).
Copies of portion of SPS Technologies Brochure (undated).
Drawing of Huck TI–Matic Blind Bolt prepared by Edgar L. Stencel (undated).
Copy of portion of Monogram Aerospace Fastener Brochure for Composi–Lok II Blind Bolt (undated).

Primary Examiner—Kenneth J. Dorner
Assistant Examiner—Jerry Redman
Attorney, Agent, or Firm—Pretty, Schroeder & Poplawski

[57] ABSTRACT

A blind fastener having a body, a core bolt, a nut and a sleeve. The core bolt passes through an axial bore of the body and includes an externally threaded portion at an inner end thereof. The nut has an enlarged head, a reduced diameter stem and a threaded bore for engaging the threaded portion of the core bolt. The sleeve is located between the enlarged head of the core bolt and a conically shaped inner portion of the body. An inner end portion of the sleeve is fixed to the stem of the nut. In a preferred embodiment, the inner end portion of the sleeve is crimped to the nut and has a thickness sufficient to engage the nut across the full width of an annular shoulder of the nut during setting of the fastener.

13 Claims, 4 Drawing Sheets

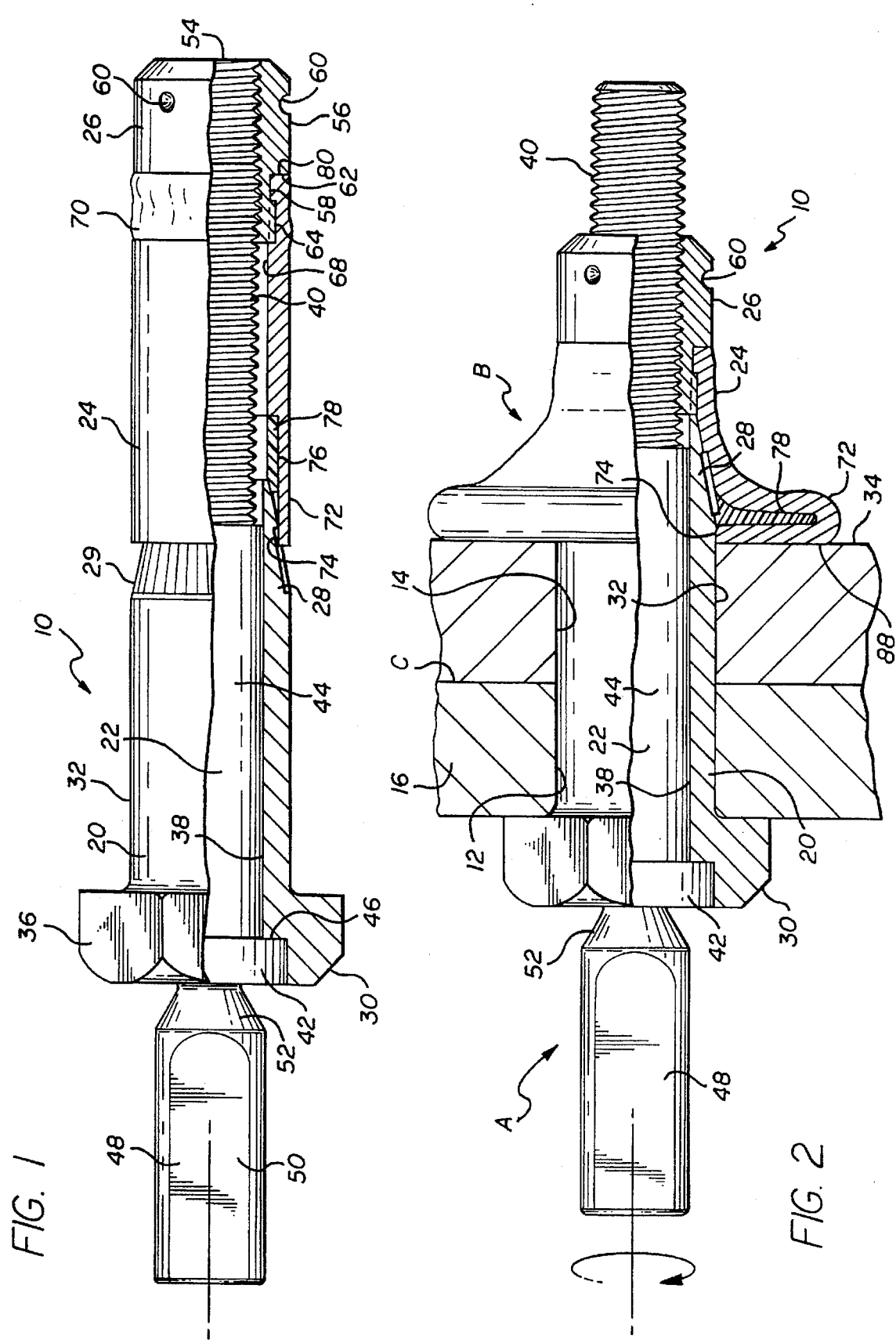

FIG. 10
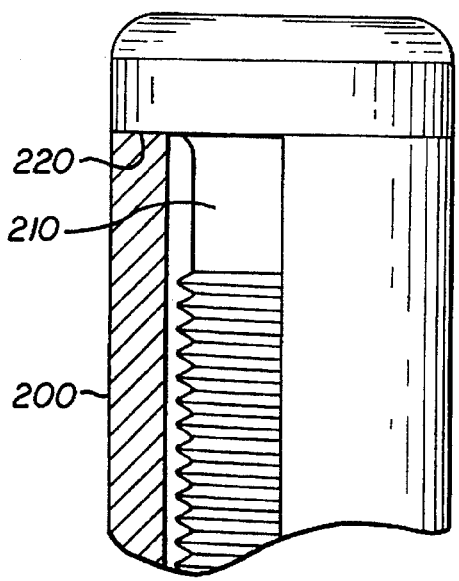
FIG. 11
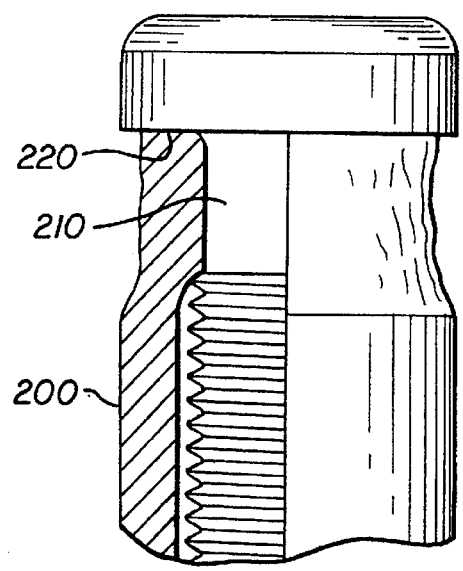
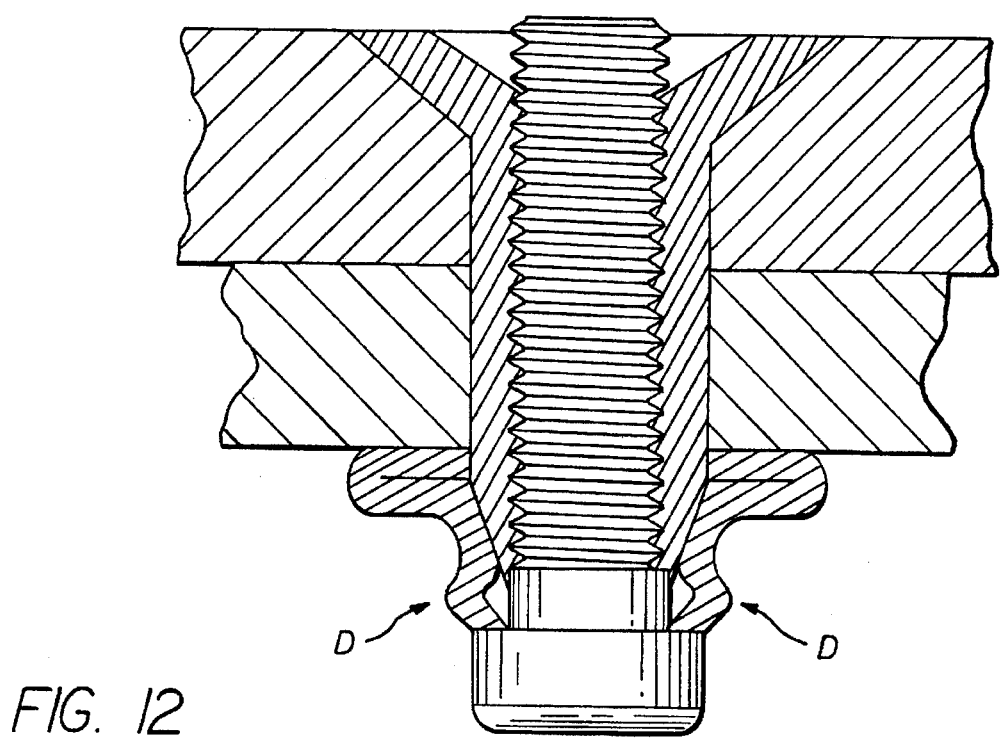
FIG. 12

BLIND FASTENER WITH DEFORMABLE SLEEVE

This application is a continuation of application Ser. No. 08/201,759, filed Feb. 25, 1994, which application is now U.S. Pat. No. 5,498,110.

This invention relates generally to blind fasteners and, in particular, to high strength blind fasteners having deformable sleeves.

BACKGROUND OF THE INVENTION

Blind fasteners are used in a variety of applications wherein access to the blind-side of panels being connected together is extremely limited or in some cases not possible. Various particular applications impose unique, stringent requirements for which the fastener must be particularly adapted. One of these applications is in the aerospace industry wherein the fasteners are required to securely fasten the panels, yet resist losing their clamping force during the service life of the aircraft. Hence, the fastener must be able to withstand the severe stresses and vibrations imposed upon them by the often harsh environment in which they are used without loosening.

One type of blind fastener is a three piece assembly having a threaded core bolt, a body and a sleeve. The body has a conical inner end and a threaded bore for receiving the core bolt. The core bolt has an enlarged head and a threaded stem for threadably engaging the body. The sleeve is unthreaded and located between the bolt head and the conical end of the body. The three piece assembly is inserted, bolt head first, into aligned openings of panels to be fastened together such that the bolt head, the sleeve and the conical end of the body are located inwardly of the blind side of the interior panel. The fastener may be set by rotating the core bolt, which causes axial movement of the bolt head and sleeve toward the panels. The outer end of the sleeve expands over the conical end of the body until it becomes seated firmly against the blind side of the interior panel. A further detailed description of this type of blind fastener is set forth in U.S. Pat. Nos. 4,457,652, 5,066,179 and 5,238,342, which are incorporated by reference herein.

While the above-described type of blind fastener functions quite well, it does have a disadvantage. In particular, the core bolt and body are threaded in the shear zone, i.e., the plane defined by the overlapping panels being fastened together, resulting in lower fatigue capabilities in both tension and shear loading of the fastener.

Another type of blind fastener overcomes the above problem. It is a three piece assembly having a core bolt, a body and a threaded sleeve. In this case, the body has an unthreaded bore for receiving the core bolt and the core bolt is threaded at its inner end only for receiving the threaded sleeve. Thus, the fastener is unthreaded in the shear zone improving its fatigue capabilities. The three piece assembly is inserted, sleeve first, through the aligned openings such that the sleeve, the threaded inner end of the core bolt, and the conical end of the body are located inwardly of the blind side of the interior panel. The fastener may then be set by rotating the core bolt, which causes axial movement of the sleeve toward the panels, bringing the sleeve into engagement with the blind side of the interior panel. A further detailed description of this type of blind fastener is set forth in U.S. Pat. Nos. 2,971,425, 3,063,329, 3,345,900 and 4,579,491.

This second type of blind fastener has its own disadvantages. In particular, to work properly, the sleeve must be relatively soft at its end adjacent the blind side of the interior panel to permit its radial expansion over the conical end of the body, yet its other end must be hard to provide the necessary strength to prevent stripping during setting of the fastener. Requiring the sleeve to have both a soft portion and a hard portion, however, restricts the types of treatment that the sleeve may undergo, which would otherwise permit the sleeve as a whole to be made softer or harder. As a result, the tensile strength and yield strength of the fastener are not as great as they could be and its fatigue capabilities are lower.

It should therefore be appreciated that there is still a need for a blind fastener having a deformable sleeve that has increased strength, but which is still relatively easy to make and simple to install.

SUMMARY OF THE INVENTION

The present invention is embodied in a blind fastener having relatively high fatigue capabilities in both tension and shear loading. The blind fastener of the present invention may be installed in aligned openings of first and second overlapping panels to secure them together, the overlapping panels defining a shear plane between them. The blind fastener itself includes a body, a core bolt, a nut and a sleeve. The body has an axial bore therethrough and a conical inner end that may be knurled around its circumference. The core bolt is configured to pass through the axial bore of the body and has an externally threaded portion at its inner end. When installed, the body and the core bolt both have unthreaded portions that are positioned across the shear plane. The nut of the blind fastener has a threaded bore for engaging the threaded portion of the core bolt. The nut also has an enlarged head at its inner end and a stem of reduced diameter at its outer end. Between the enlarged head and the stem is an annular shoulder. The enlarged head may also include a thread lock for locking the nut to the threaded portion of the core bolt upon setting of the fastener. The deformable sleeve of the blind fastener is configured to fit around the core bolt and has an inner end portion that is fixed to the stem of the nut. The sleeve also has an outer end portion adapted to engage the conical inner end of the body.

A feature of the present invention is that the sleeve and nut, because they are distinct pieces, may be separately treated to improve their desired is characteristics. For example, the nut may be heat treated and tempered to improve its hardness while the sleeve may be fully annealed to make it softer and more ductile.

Another feature of the present invention is that the inner portion of the sleeve may be provided with a sufficient thickness to support the enlarged head of the nut across the full width of the shoulder during setting of the fastener. This results in the inner portion of the sleeve having a greater resistance to buckling under compression loading. Further advantages are obtained by crimping or cold working the inner portion of the sleeve to the stem of the nut. Fixing the inner portion of the sleeve to the stem in this manner increases its hardness and tensile yield strength.

Crimping a thickened portion of the sleeve to improve its hardness and yield strength also provides benefits when performed in connection with other types of blind fasteners. For example, in the three piece blind fastener wherein the sleeve is located between the enlarged head of the core bolt and the conical end of the body, as previously described, the inner portion of the sleeve may be thickened and the thickened portion then crimped to the stem of the bolt head to achieve similar results.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 1 is a longitudinal view, partially in section, of an assembled blind fastener according to the present invention.

FIG. 2 is a longitudinal view, partially in section, of the blind fastener of FIG. 1, showing the fastener after it has been fastened to two panels.

FIG 10 is a longitudinal view, partially in section, of a sleeve that is not thickened, mounted to a bolt before crimping.

FIG. 11 is a longitudinal view, partially in section, of the sleeve and bolt of FIG. 10, after crimping.

FIG. 12 is a longitudinal view, partially in section, of a blind fastener having the sleeve and bolt arrangement of FIG. 11 showing the failure of the sleeve under compression loading.

DETAILED DESCRIPTION OF THE PREFERRED EMBODIMENTS

Figure 3:
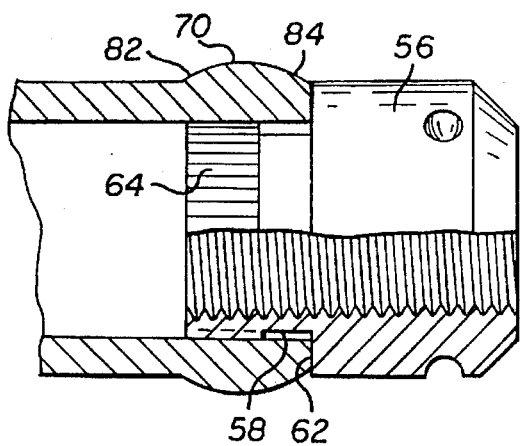
FIG. 3 is a longitudinal view, partially in section, of a sleeve according to the present invention mounted to a nut before crimping.

A blind fastener 10 according to the present invention is shown in FIGS. 1 and 2. The blind fastener 10 may be inserted through aligned openings 12, 14 in outer and inner overlapping panels 16, 18 to secure them together. As is typical of blind fasteners, the fastener 10 is installed and set from the space A adjacent the outer panel 16, the space B adjacent the inner panel being inaccessible. The panels engage each other along a shear plane C therebetween.

The blind fastener 10 includes a body 20, a core bolt 22, a sleeve 24 and a nut 26. The body 20 of the fastener may be made of titanium alloy or stainless steel and includes a tapered or conically shaped inner end 28 having a knurled exterior surface 29, an outer end having a head 30 and an intermediate portion 32 between the conical inner end 28 and the head 30. The intermediate portion has a cylindrical exterior surface 32. The body is configured such that when installed, the cylindrical exterior surface 32 forms a tight fit in the aligned openings 12, 14 of the panels 16, 18, the head 30 seats against the outer panel 16, and the conical inner end 28 is located on the blind side of the panels adjacent an interior surface 34 of the inner panel 18.

The head 30 of the body 20 is provided with surfaces 36 engageable by a suitable tool, not shown, for preventing rotation thereof during setting of the fastener 10, the surfaces 36 being the flats of a hexagonal head in the particular construction illustrated. It will be understood that various configurations may be employed for the head 30 and that the invention is not to be regarded as limited to the particular hexagonal configuration shown. For example, the head 30 may be frusto-conical and countersunk into the outer panel 16 and may be provided with suitable notches for the reception of a tool for preventing rotation of the body 20, such a configuration for the head 30 being particularly advantageous where a flush outer surface for the body is desired. Various other configurations for the head may also be employed.

The body 20 is provided with an unthreaded axial bore 38 for receiving the core bolt 22, which is longer than the body so that it extends therethrough. The core bolt may be made of titanium alloy or stainless steel and includes a threaded inner end 40, a bolt head 42 and an unthreaded intermediate portion 44. The threaded inner end 40 projects inwardly beyond the conical inner end 28 of the body. Preferably, the unthreaded intermediate portion 44 of the core bolt has a greater diameter than the threaded inner end 30 of the core bolt. This provides a core bolt with greater shear strength in the shear zone, yet permits the thread diameter to be smaller, reducing the torque necessary to set the fastener.

The bolt head 42 is adapted to seat on an annular, outwardly facing bolt head seat 46 in the head 30 of the body. The bolt head 42 also includes a stem 48 provided with a pair of wrenching hats 50 adapted to engage the rotary wrench bit of an installation tool (not shown). An annular break off groove 52 may be provided, which is adapted to fracture when a preselected stress is applied to the stem 48 during the setting of the blind fastener. Such fracture is designed to occur when the break off groove is located flush with or slightly into the space A adjacent the outer panel 16.

It will be appreciated that while a particular bolt head configuration is disclosed, various other bolt head configurations may be utilized. For example, a hex head may be substituted for the wrenching flats or the bolt head may be provided with screwdriver slots, tool receiving notches, or the like.

Threaded on the inner end 40 of the core bolt 22 is the nut 26. The nut may be made of titanium alloy or stainless steel. Preferably, the nut is heat treated and tempered or otherwise treated to increase its hardness and strength. In situations where the space B on the blind side of the panels is limited, a relatively short nut in length will be necessary. Such a nut may be specially treated as necessary to give it the strength and hardness characteristics required.

The nut 26 includes an internally threaded bore 54, an enlarged head 56 and a reduced diameter stem 58. The enlarged head 56 may include a plurality of indentations 60 around its periphery that are configured to create a radial deformation in the nut threads to effect an interference fit between the pitch diameters of the threads of the core bolt and the nut so that the nut will not back off after setting of the fastener, even under conditions of severe vibration, and the like. Alternatively, the nut is deformed into a slightly elliptical or triangular cross-sectional configuration, although other configurations may be utilized.

Figure 5:
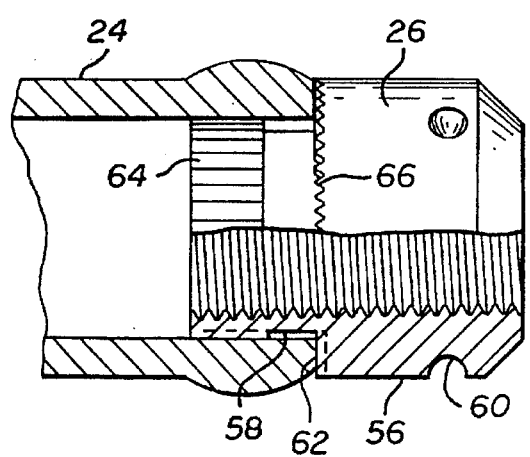
FIG. 5 is a longitudinal view, partially in section, of an alternative sleeve/nut construction of the present invention.

The diameter of the enlarged head 56 of the nut is greater than the stem 58 of the nut. Therefore, between the enlarged head and the stem is an annular shoulder 62. In the preferred embodiment, both the stem and shoulder are knurled at 64 and 66, respectively (see FIG. 5). With reference to FIGS. 1 and 2, however, only the stem is knurled at 64.

Located on the stem 58 of the nut 26 and in engagement with the conical inner end 28 of the body 20 is the sleeve 24.

Preferably, the sleeve is made from titanium alloy or stainless steel and is fully annealed or otherwise treated to make it soft and ductile. The sleeve has an unthreaded bore 68, an inner end portion 70 for engaging the nut and an outer end portion 72 for engaging the body. The outer end portion 72 has an outer end 74 that preferably engages the conical inner end 28 of the body. The outer end portion may also include an annular recess 76 for receiving an annular insert 78. The insert is preferably made of a material having a lower tensile strength than the outer portion of the sleeve, such as Delrin, Celcon, Teflon, Nylon, fiberglass reinforced versions of the above or softened metal. The function of the insert will be described in more detail later. The inner end portion 70 of the sleeve is fixed to the knurled stem 64 of the nut and has an inner end 80 that preferably engages the shoulder of the nut. Preferably, the inner end portion of the sleeve is fixed to the nut by crimping or by otherwise cold working the part. This results in the inner end portion of the sleeve being harder and stronger than the outer end portion of the sleeve.

Figure 4:
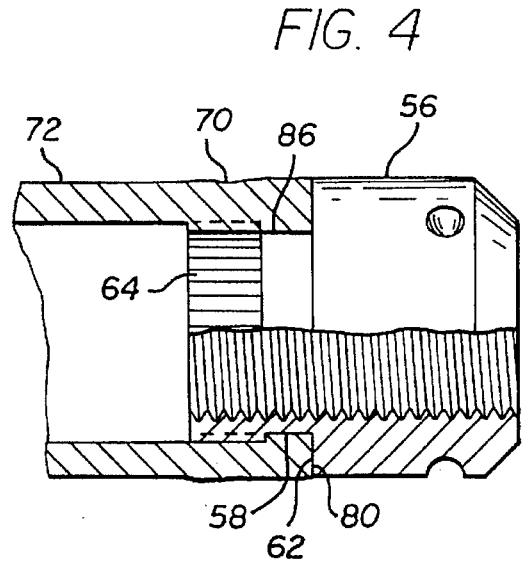
FIG. 4 is a longitudinal view, partially in section, of the sleeve and nut of FIG. 3 after crimping.

With reference to FIG. 3, the sleeve and nut of a preferred embodiment of the invention are shown before crimping of the sleeve to the nut. The inner end portion 70 of the sleeve is provided with a radially outwardly bulged portion 82, having a curved outer surface 84 that, at its greatest width, is greater in diameter than the diameter of the enlarged head 56 of the nut. Crimping the radially outwardly bulged portion onto the stem 58 of the nut results in the annular shoulder 62 of the nut being engaged by the inner end 80 of the sleeve across the full width of the annular shoulder (FIG. 4). Notably, the thickness of the radially outwardly bulged portion is chosen such that after crimping, the outer diameter of the inner end portion 70 of the sleeve is substantially the same as the outer end portion 72 of the sleeve. In the preferred embodiment, an unthreaded cylindrical land 86 is disposed between the enlarged head and the knurled portion of the stem and the thickness of the radially outwardly bulged portion is sufficient such that, upon crimping, the material flows into contact with the land along its full axial length, yet remains in contact with the shoulder of the nut across its full width. This results in the inner end portion of the sleeve having a greater bearing surface and improved strength against buckling upon setting of the fastener.

The operation of the blind fastener 10 of the present invention will now be described. First, the fastener is assembled as shown in FIG. 1 with the nut 26 sufficiently threaded onto the core bolt 22 such that the outer end 74 of the sleeve 24 preferably engages the knurling 29 on the body 20. This insures that the nut and the core bolt will not turn together upon rotation of the core bolt. The assembled fastener is then inserted, nut first, through the aligned openings 12, of the overlapping panels 16, 18 with the head 30 of the body firmly seated against the outer panel 16. Suitable tools are applied to the head of the body and to the bolt stem 48, or suitable components of a single tool are applied as appropriate. By means of such a tool or tools, the body 20 is prevented from rotating and the core bolt 22 is rotated. This rotation of the core bolt causes axial movement of the nut 26 toward the body. As the nut is moved axially toward the body in response to the rotation of the core bolt, the annular insert 78 and the outer end 74 of the sleeve expand over the conical inner portion 28 of the body and over the adjacent cylindrical exterior surface 32 of the body until the outer end of the sleeve is firmly seated against the interior surface 34 of the inner panel 18.

As described in U.S. Pat. No. 4,457,652, the insert 78 causes the sleeve to buckle radially outward upon contact with the inner panel to form a large bearing surface 88. In particular, upon the core bolt 22 continuing to be drawn into the body 20, the insert 78 and the outer end portion 72 of the sleeve proceed over the body. However, because of the stress applied by the higher tensile strength outer end portion of the sleeve to the lower tensile strength insert, the outer end 74 of the outer end portion of the sleeve tapers inwardly toward the exterior surface 32 of the body. Consequently, the interior of the sleeve does not conform to the exterior surface of the body, but rather assumes a buckling mode. Consequently, as shown in FIG. 2, upon contact with the blind side of the inner panel, the outer end portion of the sleeve buckles radially outward without substantial pressure being applied by the outer end 74 of the sleeve to the blind side of the inner panel and with a uniform large bearing surface 88 approximately circular in shape.

Once the outer end portion of the sleeve has been brought into firm engagement with the interior surface of the inner panel to clamp the panels between the nut and the head 30 of the body, further rotation of the core bolt results in failure thereof at the break of groove 52 in torsional shear; thereby providing a flush structure for the core bolt relative to the body. The hereinbefore described thread lock structure 60 for the nut and the core bolt elects an interference fit between the pitch diameters of the threads on the nut and the core bolt to prevent loosening of the nut even under conditions of severe vibration or the like.

Figure 6:
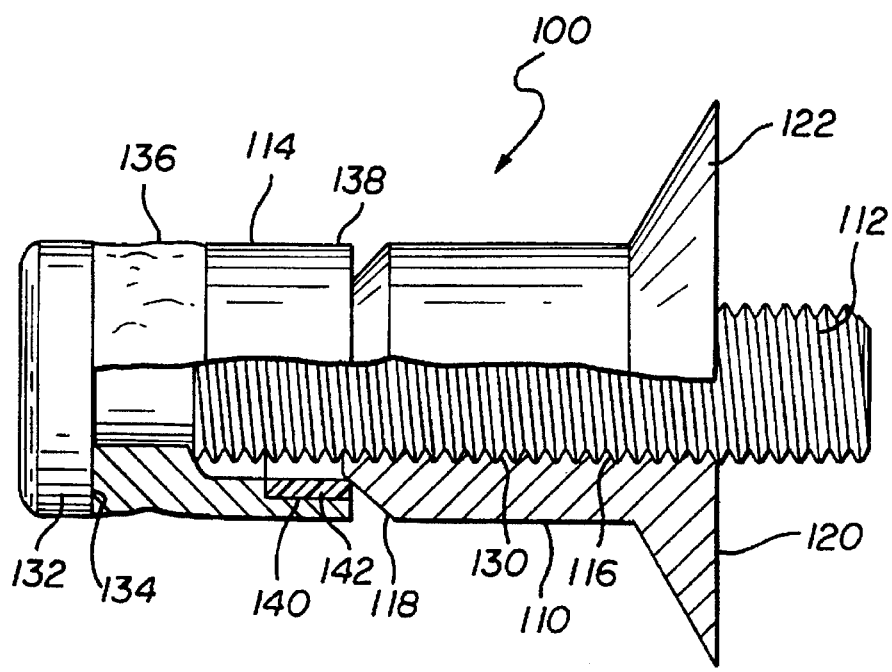
FIG. 6 is a longitudinal view, partially in section, of an alternative embodiment of an assembled blind fastener according to the present invention.
Figure 7:
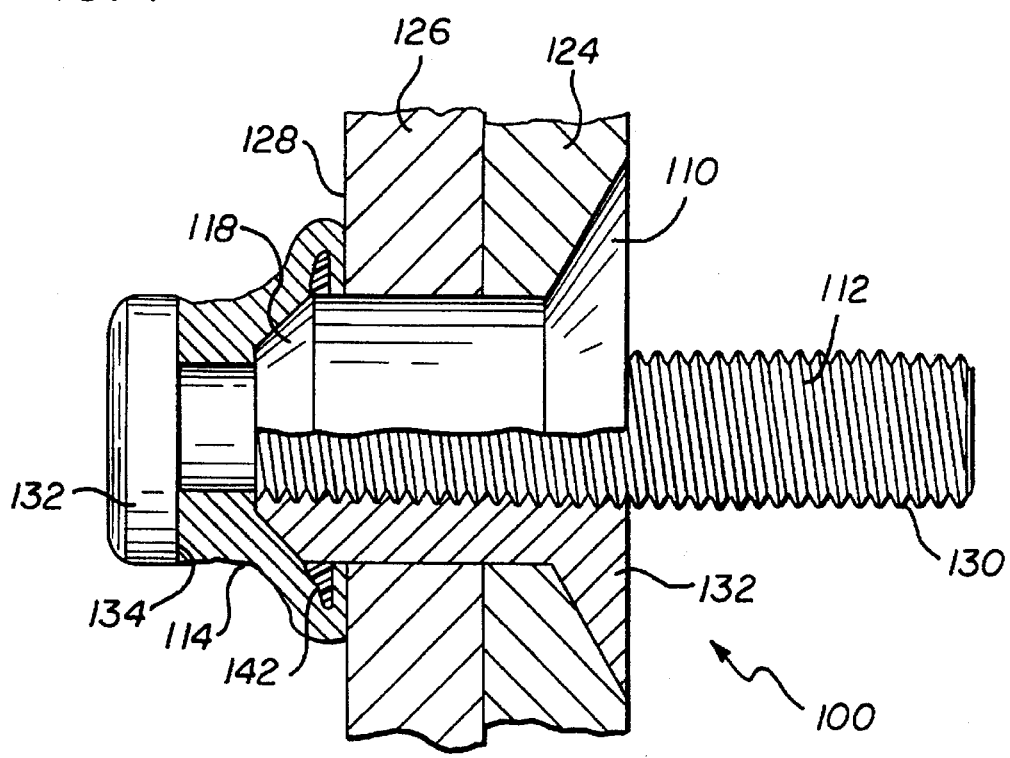
FIG. 7 is a longitudinal view, partially in section, of the blind fastener of FIG. 6, showing the fastener after it has been fastened to two panels.

With reference now to FIGS. 6 and 7, another embodiment 100 of the present invention is shown having a body 110, a core bolt 112 and a sleeve 114. The body has a threaded axial bore 116, an inner portion 118 and an outer portion 120. The inner portion is conically shaped at an angle of about 15° to 30° to the axis of the body. The outer portion has an enlarged head 122 adapted to seat against an outer panel 124. The length of the body is sufficient to extend the conical portion 118 beyond the blind side of an inner panel 126 even in the maximum grip situation by a distance sufficient to permit the sleeve 114 to engage a blind side surface 128 of the inner panel.

The core bolt 112 has a stem 130 extending through the body and an enlarged head 132 adjacent to the conical portion 118 of the body. The diameter of the enlarged head is larger than the diameter of stem and customarily equal to the outer diameter of the body. Between the enlarged head and the stem is an annular shoulder 134.

On the bolt stem 130 between the conical portion 118 of the body and the bolt head 132 is the sleeve 114 which has an inner end portion 136 adjacent to the bolt head and an outer end portion 138 adjacent to the conical portion of the body. The outer end portion may include an annular recess 140. The external diameter of the sleeve is customarily equal to the diameter of the body.

An insert 142 is located on the bolt stem in the sleeve recess 140. As in the previous embodiment, the insert has a tensile strength very much less than the tensile strength of the sleeve. The insert may be the same length as the recess. However, depending on the relative tensile strength of the insert and the sleeve, the length of the insert may be between about 50% and 100% of the length of the recess. The inner end portion of the sleeve is fixed to the stem of the bolt, preferably by crimping, or by otherwise cold working the part. This results in the inner end portion of the sleeve being harder and stronger than the outer end portion of the sleeve.

Figure 8:
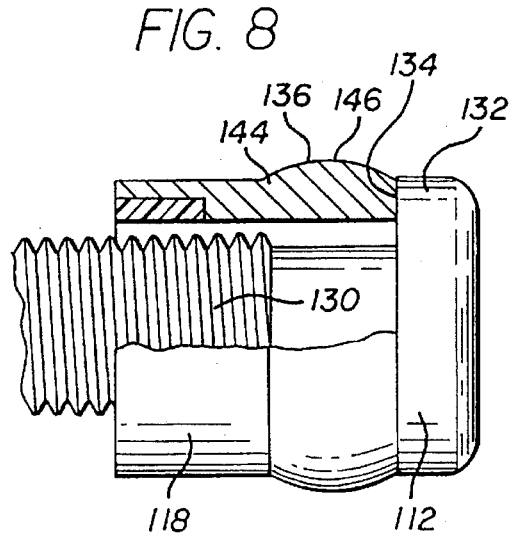
FIG. 8 is a longitudinal view, partially in section, of a sleeve according to the present invention mounted to a bolt stem, before crimping.
Figure 9:
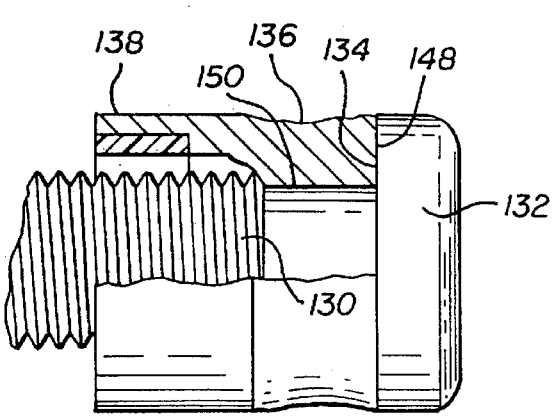
FIG. 9 is a longitudinal view, partially in section, of the sleeve and bolt stem of FIG. 8, after crimping.

With reference to FIG. 8, the sleeve 118 and the core bolt 112 of the alternative embodiment of the invention are shown before crimping of the sleeve to the stem 130 of the core bolt. The inner end portion 136 of the sleeve is provided with a radially outwardly bulged portion 144, having a curved outer surface 146 that, at its greatest width, is greater in diameter than the outer diameter of the enlarged head 132 of the core bolt. Crimping the radially outwardly bulged portion onto the stem of the core bolt results in the annular shoulder 134 of the core bolt being engaged by an inner end 148 of the sleeve across the full width of the annular shoulder (FIG. 9). Notably, the thickness of the radially outwardly bulged portion is chosen such that, after crimping, the outer diameter of the inner end portion 136 of the sleeve is substantially the same as the outer end portion 138 of the sleeve. In the preferred embodiment, a cylindrical land 150 is disposed between the enlarged head 132 and the threading on the stem 130 and the thickness of the radially outwardly bulged portion is sufficient such that, upon crimping, the material mows into contact with the land along its full axial length, yet remains in contact with the shoulder of the core bolt across its full width. This results in the inner end of the sleeve having a greater bearing surface and improved strength against buckling upon setting of the fastener.

The operation of the blind fastener 100 shown in FIGS. 6 and 7, is substantially similar to the operation of the blind fastener 10 shown in FIGS. 1 and 2. As the bolt is drawn into the body, the insert 142 and the outer end portion 138 of the sleeve contact the conical portion of the body, causing the outer end portion of the sleeve to expand outwardly. Upon the bolt 112 continuing to be drawn into the body, the insert and the outer end portion of the sleeve proceed over the body, however, because of the stress applied by the high tensile strength outer end portion of the sleeve to the low tensile strength insert, the outer end of the sleeve tapers inwardly toward the exterior surface of the body. Consequently, upon contact with the blind side 128 of the inner panel 126, the outer end portion of the sleeve buckles radially outward without substantial pressure being applied by the outer end of the sleeve to the blind side of the inner panel and with a uniform large bearing surface, approximately circular in shape.

As mentioned above, providing a radially outwardly bulged portion on the inner end portion of the sleeve and crimping it to the stem of the bolt provides significant advantages. With reference to FIG. 10, a sleeve 200 and core bolt 210 are shown wherein the sleeve has a uniform outer diameter. Upon crimping, the sleeve is fastened to the core bolt, however, it does not bear against a shoulder 220 of the core bolt across the full width of the shoulder (FIG. 11). During setting, this can result in premature buckling of the sleeve as shown at D in FIG. 12. This is in contrast to the present invention wherein the sleeve supports the shoulder across its full width, increasing resistance to buckling. Additionally, crimping the sleeve to the stem results in the sleeve being cold worked, increasing its hardness and yield strength.

It should be appreciated from the foregoing description that the present invention provides an improved blind fastener that has relatively high fatigue capabilities in both tension and shear loading. The sleeve may be treated as desired to make it sufficiently deformable and then fastened to the stem of a bolt or nut by cold working in such a manner as to increase its yield strength.

Although the invention has been described in detail with reference only to the preferred embodiments, those having ordinary skill in the art will appreciate that various modifications can be made without departing from the invention. Accordingly, the invention is defined with reference to the following claims.

We claim:

1. A blind fastener for inserting in aligned openings of first and second overlapping panels to secure them together, the overlapping panels defining a shear plane between them, the blind fastener comprising:

a body having an axial bore therethrough, a head at an outer end thereof for engaging an outer one of said first and second overlapping panels, a conically shaped inner end, and an external cylindrical surface between the head and the conically shaped inner end, the external cylindrical surface to be positioned inside the aligned openings and across the shear plane of the overlapping panels upon setting of the fastener;

a core bolt configured to pass through the axial bore of the body having a bolt head at an outer end thereof, an externally threaded portion at an inner end thereof, and an intermediate unthreaded portion between the bolt head and the threaded portion, the intermediate unthreaded portion to be positioned across the shear plane upon setting of the fastener;

a nut having a threaded bore for engaging the threaded portion of the core bolt; and a sleeve configured to fit around the core bolt having an outer end portion adjacent the conically shaped inner portion of the body and an inner end portion that engages the nut, the outer end portion of the sleeve being sufficiently deformable such that movement of the nut toward the body during setting of the fastener deforms the sleeve to a fully set condition in overlying contact with an inner one of said first and second overlapping panels;

wherein the nut has a knurled portion and the inner end portion of the sleeve engages the knurled portion of the nut and;

wherein the conically shaped inner end of the body has an exterior surface that is knurled around its circumference and the outer end portion of the sleeve engages the knurled exterior surface.

2. The blind fastener of claim 1, wherein the nut includes a thread lock for locking the nut to the externally threaded portion of the core bolt upon setting of the fastener.

3. The blind fastener of claim 1, wherein the sleeve has an unthreaded axial bore.

4. The blind fastener of claim 1, wherein the intermediate unthreaded portion of the core bolt has a greater diameter than the externally threaded portion of the core bolt.

5. A blind fastener for inserting in aligned openings of first and second overlapping panels to secure them together, the overlapping panels defining a shear plane between them, the blind fastener comprising:

a body having an axial bore therethrough, a head at an outer end thereof for engaging an outer one of said first and second overlapping panels, a conically shaped inner end, and an external cylindrical surface between the head and the conically shaped inner end, the external cylindrical surface to be positioned inside the aligned openings and across the shear plane of the overlapping panels upon setting of the fastener;

a core bolt configured to pass through the axial bore of the body having a bolt head at an outer end thereof, an externally threaded portion at an inner end thereof, and an intermediate unthreaded portion between the bolt head and the threaded portion, the intermediate unthreaded portion to be positioned across the shear plane upon setting of the fastener;

a nut having a threaded bore for engaging the threaded portion of the core bolt; and a unitary sleeve configured to fit around the core bolt having a soft outer end portion and a hard inner end portion that engages the nut, the soft outer end portion located adjacent the conically shaped inner end of the body and being sufficiently deformable such that movement of the nut toward the body during setting of the fastener deforms the sleeve to a fully set condition in overlying contact with an inner one of said first and second overlapping panels.

6. The blind fastener of claim 5, wherein the nut has a knurled portion and the inner end portion of the sleeve engages the knurled portion of the nut and;

wherein the conically shaped inner end of the body has an exterior surface that is knurled around its circumference and the outer end portion of the sleeve engages the knurled exterior surface.

7. The blind fastener of claim 5, wherein the nut includes a thread lock for locking the nut to the externally threaded portion of the core bolt upon setting of the fastener.

8. The blind fastener of claim 5, wherein the sleeve has an unthreaded axial bore.

9. The blind fastener of claim 5, wherein the intermediate unthreaded portion of the core bolt has a greater diameter than the externally threaded portion of the core bolt.

10. The blind fastener of claim 5, wherein the inner end portion of the sleeve has been hardened relative to the outer end portion of the sleeve.

11. The blind fastener of claim 10, wherein the sleeve is made by a method comprising the steps of:

providing a sleeve having a radially outwardly bulged portion at one end; and deforming the radially outwardly bulged portion of the sleeve to reduce its outer diameter and thereby form the hardened inner end portion of the sleeve.

12. The blind fastener of claim 10, wherein the radially outwardly bulged portion is deformed by cold working.

13. The blind fastener of claim 10, wherein the radially outwardly bulged portion is deformed until it has the same outer diameter as the remainder of the sleeve.

* * * * *